United States Patent Office 2,991,301
Patented July 4, 1961

---

2,991,301
POLYETHYLENE GLYCOL ESTERS OF BETA-CARBOXYETHYLSILANES
Gustav A. Schmidt, Schenectady, N.Y., assignor to General Electric Company, a corporation of New York
No Drawing. Filed Sept. 16, 1959, Ser. No. 840,250
4 Claims. (Cl. 260—448.8)

This invention relates to certain water soluble and water dispersible organosilicon compositions. In particular, this invention relates to certain polyethylene glycol esters of organosilicon compounds containing silicon-bonded beta-carboxyethyl radicals. This invention also relates to the method of preparation of the foregoing materials.

It is an object of the present invention to provide novel organosilicon compounds which are soluble in water and stable in water, and which are particularly useful as household and industrial detergents, liquid washing products, and as components in metal cleaner formulations, and in polishes and cosmetic formulations and which are also useful as intermediates in the preparation of more complex products.

The organosilicon compositions of the present invention are characterized by the presence of at least one silicon-bonded polyethylene glycol ester radical, having the formula:

(1)    $-CH_2CH_2COO(CH_2CH_2O)_nH$ in each molecule, where $n$ is an integer equal to at least 3, and preferably from 3 to 6, inclusive.

The organosilicon compositions of the present invention are characterized by the formula:

(2)   $[H(OCH_2CH_2)_nO]_a$
                 $[CH_3]_bSiCH_2CH_2COO(CH_2CH_2O)_nH$ where $n$ is as previously defined, $a$ is an integer equal to from 2 to 3, inclusive, $b$ is a whole number equal to from 0 to 1, inclusive, the sum of $a+b$ is equal to 3.

One class of polymeric organopolysiloxanes which can be prepared from the compositions of Formula 2 have the formula:

(3)    $H(OCH_2CH_2)_nOOCCH_2CH_2Si(CH_3)_bO_{\frac{3-b}{2}}$ where R, $n$, and $b$ are as previously defined. Copolymers which can be prepared from the compositions of Formula 2 contain both siloxane units of Formula 3 and units having the formula:

(4)    $(R')_cSiO_{\frac{4-c}{2}}$ where R' is selected from the class consisting of monovalent hydrocarbon radicals and halogenated monovalent hydrocarbon radicals, and $c$ has an average value of from 0.5 to 3, inclusive. These polymers and copolymers are described and claimed in my joint copending application with Howard A. Vaughn, Jr., Serial Number 840,249, filed concurrently herewith and assigned to the same assignee as the present application.

The monomeric materials of Formula 2 are prepared by effecting reaction between a hydrolyzable cyanoethylsilane selected from the class consisting of beta-cyanoethyltrichlorosilane and methyl-beta-cyanoethyldichlorosilane having the formula:

(5)    $(CH_3)_b(Cl)_aSiCH_2CH_2CN$ and a polyethylene glycol having the formula:

(6)    $H(OCH_2CH_2)_nOH$

The reaction between the cyanoethylsilane of Formula 5 and the polyethylene glycol of Formula 6 is effected by merely mixing the reactants and heating, preferably with stirring, at an elevated temperature until reaction is effected. At this time, the desired reaction product within the scope of Formula 2 is isolated from the unreacted starting material by fractional distillation. The proportions of the two reactants employed can vary within wide limits, but for economic reasons it is preferred to provide one mol of the polyethylene glycol for each mol of silicon-bonded chlorine atoms in the cyanoalkylsilane plus one additional mol of the polyalkylene glycol for the nitrile radical. Thus, for the reaction between beta-cyanoethyltrichlorosilane and triethylene glycol, it is preferred to employ 4 mols of the triethylene glycol for each mol of the beta-cyanoethyltrichlorosilane.

While the precise mechanism of the reaction of the present invention is not important to the production of the monomeric material of Formula 2, it is believed that the reaction proceeds by the substitution of the polyethylene glycol nucleus for the silicon-bonded chlorine atoms of the cyanoethylchlorosilane, with simultaneous alcoholysis of the nitrile radical of the cyanoethylchlorosilane to produce the desired ester of Formula 2. While the molar ratio of ingredients in the reaction mixture has been described previously, no particular disadvantage is observed when employing a molar excess such as a 200 to 500% molar excess of either reactant. The reaction is preferably carried out at a temperature of from about 50 to 150° C. and is usually completed in a time of from 1 to 6 hours. However, the exact reaction time and reaction temperature are dependent to some extent on the particular reactants employed. For convenience, it is preferred to conduct the reaction at the reflux temperature of the reaction mixture, so as to insure suitable agitation of the reaction mixture.

The hydrolyzable cyanoethylsilanes of Formula 5 are known in the art and are described, for example, in French Patent 1,118,500, in British Patent 786,020, and in Belgium Patents 553,603 to 553,606. In addition, a general method of preparation of compounds within the scope of Formula 5 is found in the copending application of Ben A. Bluestein, Serial No. 783,102, filed December 29, 1958, now U.S. Patent No. 2,971,970 and assigned to the same assignee as the present invention. In general, these compounds are prepared by effecting reaction between 1 mol of a silicon hydride having the formula:

(7)    $(CH_3)_b(Cl)_aSiH$ and acrylonitrile, in which case the silicon hydride adds across the double bond of the acrylonitrile to form the compound within the scope of Formula 5.

The preparation of the polymeric materials within the scope of Formula 3 is accomplished by merely hydrolyzing the monomeric material of Formula 2 to hydrolyze the silicon-bonded polyethylene glycol nucleus and to cause condensation of the resulting hydrolysis product by conventional means. The preferred method for carrying out this hydrolysis and condensation is to add the compound within the scope of Formula 2 or a mixture of such compounds to a large volumetric excess of water containing an acid which will render the pH of the solution less than about 3. Of particular use in carrying out this hydrolysis and condensation are hydrochloric acid solutions and sulfuric acid solutions. In general, I employ about a 10 to 100-fold volumetric excess of the aqueous acid solution in carrying out the hydrolysis. The hydrolysis and condensation can be carried out at room temperature, although the use of elevated temperatures is not precluded. Separation of the polymer of Formula 3 from the reaction mixture can be accomplished by fractional distillation.

The copolymeric organopolysiloxanes described above can be prepared by several different methods. In one method, a monomeric silane within the scope of Formula 2 is cohydrolyzed with one or more additional hydrolyzable silanes to form a cohydrolysis and co-condensation product. In general, where the siloxane of Formula 3 is present with other siloxane units of Formula 4, it is preferred to have the siloxane of Formula 3 present in an amount equal to at least 1% by weight, e.g., from 1 to 99% by weight. Among the various hydrolyzable silanes which can be cohydrolyzed and co-condensed with the silane of Formula 3 are those having the formula:

(8) $(R')_d Si(X)_{4-d}$ where R' is as previously defined, X represents a hydrolyzable radical such as a halogen atom, an alkoxy group, an acyloxy group, etc., and $d$ is a whole number equal to from 0 to 3, inclusive. Among the particular hydrolyzable silanes within the scope of Formula 8 can be mentioned, for example, ethylorthosilicates, methyltrichlorosilane, methyltriethoxysilane, phenyltrichlorosilane, methyl-tetrachlorophenyldichlorosilane, dimethyldichlorosilane, methylphenyldichlorosilane, triphenylchlorosilane, trimethylchlorosilane, etc.

A second method for forming the copolymeric materials described above is by the reaction of a preformed siloxane of Formula 3, with a preformed siloxane having the average Formula 4. These equilibration reactions are well known in the art and can be carried out in the presence of conventional alkaline or acid catalysts for siloxane polymerization. In general, these reactions are carried out under anhydrous conditions at temperatures of from room temperature up to about 100° C.

While a number of different R' radicals in the various formulae presented above have been described, it should be understood that the R' group can be any halogenated or non-halogenated monovalent hydrocarbon radical. Included among these monovalent hydrocarbon radicals are alkyl radicals, e.g., methyl, ethyl, propyl, butyl, octadecyl, etc. radicals; aryl radicals, e.g., phenyl, naphthyl, tolyl, xylyl, etc. radicals; aralkyl radicals, e.g., benzyl, phenylethyl, etc. radicals; halogenated aryl radicals, and halogenated alkyl radicals, e.g., chloromethyl, trifluoromethyl, chlorophenyl, trichlorophenyl, etc. radicals; and alkenyl radicals, e.g., vinyl, allyl, cyclohexyl, etc. radicals. Preferably R' is methyl.

Among the many polyethylene glycols within the scope of Formula 6 which can be employed in the practice of my invention can be mentioned, for example, triethylene glycol, tetraethylene glycol, hexaethylene glycol, decaethylene glycol, etc. The products within the scope of the present invention prepared from the glycols of Formula 6 are unexpectedly unique since when a polyalkylene glycol other than an ethylene glycol is employed the resulting ester is not water soluble. Furthermore, when an ethylene glycol lower than triethylene glycol, such as diethylene glycol, is employed the resulting product is again not water soluble.

In order that those skilled in the art may better understand how the present invention can be practiced, the following examples are given by way of illustration and not by way of limitation. All parts are by weight.

*Example 1*

Approximately 190 parts of beta-cyanoethyltrichlorosilane was added with stirring to 750 parts of triethylene glycol. This mixture was stirred at 75° C. for 30 minutes and then heated for 3 hours at 125° C. The resulting product was stripped to a pot temperature of 100° C. at 0.5 mm. to yield about 600 parts of an ester having the formula:

(9)
$[HO(CH_2CH_2O)_3]_3SiCH_2CH_2COO(CH_2CH_2O)_3H$ whose identity was established by infrared analysis. This product was a water-soluble liquid having a viscosity of about 15 centistokes at 25° C.

*Example 2*

An organopolysiloxane having the average formula:

(10) $HO(CH_2CH_2O)_3OCCH_2CH_2SiO_{3/2}$ is formed by adding 10 parts of the fluid of Example 1 to 100 parts of a 10% aqueous sulphuric acid solution and agitating the mixture for 30 minutes at room temperature. At the end of this time, the siloxane of Formula 10 precipitates from the reaction mixture and is separated by filtration and washed with water to remove all traces of the sulphuric acid.

*Example 3*

A copolymeric organopolysiloxane fluid consisting essentially of trimethylsiloxane units and siloxane units of Formula 10 is prepared by adding one part of the siloxane of Example 3 and one part by weight of hexamethyldisiloxane to a mixture of 50 parts of a 6% aqueous hydrochloric acid solution and 60 parts of acetone. Agitation of the reaction mixture at a temperature of 50° C. for 2 hours causes equilibration of the siloxane components to produce the fluid described above. The product is isolated from this reaction mixture by stripping the aqueous hydrochloric acid and acetone from the reaction mixture. A household detergent formulation useful in the removal of soil from textile fabrics is prepared by dissolving 10 parts of this silicone fluid in 100 parts of water.

*Example 4*

A liquid siloxane copolymer is prepared by adding one part of the silane of Formula 9, one part of a silane having the formula:

(11) $[HO(CH_2CH_2O)_3]_3SiCH_3$ 2 parts of a silane having the formula:

(12) $HO(CH_2CH_2O)_3Si(C_6H_5)_3$ 4 parts of a silane having the formula:

(13) $[HO(CH_2CH_2O)_3]_2Si(CH_3)(C_6H_4Cl)$ and 1 part of a silane having the formula:

(14) $[HO(CH_2CH_2O_3]_4Si$ to 100 parts by weight of a 10% aqueous sulphuric acid solution and stirring the reaction mixture at 70° C. for 4 hours. During this time, the various silanes in the reaction mixture are hydrolyzed to produce triethylene glycol and silicon-bonded hydroxyl groups, and the silicon-bonded hydroxyl groups condense, resulting in the formation of the liquid copolymeric siloxane. At the end of this time, the reaction mixture is stripped to remove the triethylene glycol and water. After the first stripping reaction, the fluid is again mixed with water and stripped to further purify the product, which is then added to an aqueous sodium hydroxide solution. The resulting polymer contains intercondensed siloxane units of Formula 10 with methylsiloxane units, triphenylsiloxane units, methylchlorophenylsiloxane units, and silicon dioxide units. The silanes of Formulae 11 through 14 are prepared by reacting the corresponding chlorosilanes with triethylene glycol.

While the foregoing examples have illustrated many of the variables in my invention, it should be understood that the full scope of my invention is defined by the foregoing description and the appended claims. Thus, the examples have illustrated only a few of the many polyethylene glycols which can be employed in the preparation of the monomeric materials within the scope of Formula 2. It should be emphasized that a broad range of polyethylene glycols are useful in the preparation of a great variety of products within the scope of Formula 2. Furthermore, the examples have been limited to only a few of the various reaction conditions which can be satisfactorily employed in the process of the present invention. It should be understood that the process conditions employed are not critical, any of those within the foregoing description of the invention being satisfactory to produce the products of the present invention.

What I claim as new and desire to secure by Letters Patent of the United States is:

1. An organosilane having the formula $$[H(OCH_2CH_2)_nO]_a[CH_3]_bSiCH_2CH_2COO(CH_2CH_2O)_nH$$

where $a$ is an integer equal from 2 to 3, inclusive, $b$ is a whole number equal to from 0 to 1, inclusive, the sum of $a+b$ is equal to 3, and $n$ is an integer equal to at least 3.

2. An organosilane having the formula $$[HO(CH_2CH_2O)_3]_3SiCH_2CH_2COO(CH_2CH_2O)_3H$$

3. The process for preparing an organosilane having the formula $$[H(OCH_2CH_2)_nO]_a[CH_3]_bSiCH_2CH_2COO(CH_2CH_2O)_nH$$

which comprises heating a polyethylene glycol having the formula $$H(OCH_2CH_2)_nOH$$

with a member selected from the class consisting of beta-cyanoethyltrichlorosilane and methyl-beta-cyanoethyldichlorosilane where $a$ is an integer equal to from 2 to 3, inclusive, $b$ is a whole number equal to from 0 to 1, inclusive, the sum of $a+b$ being equal to 3, and $n$ is an integer equal to at least 3.

4. The process of forming an organosilane having the formula $$[HO(CH_2CH_2O)_3]_3SiCH_2CH_2COO(CH_2CH_2O)_3H$$

which comprises heating beta-cyanoethyltrichlorosilane with triethylene glycol.

References Cited in the file of this patent

UNITED STATES PATENTS

| | | |
|---|---|---|
| 2,476,307 | Klein et al. | July 19, 1949 |
| 2,839,558 | Kirkpatrick et al. | June 17, 1958 |
| 2,920,091 | Black | Jan. 5, 1960 |

FOREIGN PATENTS

| | | |
|---|---|---|
| 1,183,863 | France | Feb. 2, 1959 |